United States Patent
Winn (10) Patent No.: US 11,109,654 B2
(45) Date of Patent: Sep. 7, 2021

(54) ILLUMINATED WALKING ASSISTANCE APPARATUS

(71) Applicant: Ray Winn, Las Vegas, NV (US)

(72) Inventor: Ray Winn, Las Vegas, NV (US)

( * ) Notice: Subject to any disclaimer, the term of this patent is extended or adjusted under 35 U.S.C. 154(b) by 204 days.

(21) Appl. No.: 16/471,276

(22) PCT Filed: Mar. 6, 2019

(86) PCT No.: PCT/US2019/020934
§ 371 (c)(1),
(2) Date: Jun. 19, 2019

(87) PCT Pub. No.: WO2020/180312
PCT Pub. Date: Sep. 10, 2020

(65) Prior Publication Data
US 2021/0127803 A1    May 6, 2021

(51) Int. Cl.
*A45B 3/04* (2006.01)
*A45B 9/02* (2006.01)
(Continued)

(52) U.S. Cl.
CPC ............... *A45B 3/04* (2013.01); *A45B 9/02* (2013.01); *F21L 4/08* (2013.01); *F21V 9/08* (2013.01); *F21V 23/0407* (2013.01); *F21V 23/0464* (2013.01); *F21V 23/0492* (2013.01); *G02B 6/001* (2013.01); *G02B 6/0006* (2013.01);
(Continued)

(58) Field of Classification Search
CPC .... A45B 3/02; A45B 3/04; A45B 7/00; A45B 7/005; A45B 9/04; A45B 2009/005; F21L 4/08; F21V 9/08; F21V 23/0407; F21V 23/0464; F21V 23/0492; G02B 6/006; G02B 6/001
See application file for complete search history.

(56) References Cited

U.S. PATENT DOCUMENTS 1,824,449 A    9/1931   Sjoberg
2,271,190 A    6/1940   Giaimo
(Continued)

FOREIGN PATENT DOCUMENTS

CN    108030204    5/2018
JP    2015078917   4/2015

OTHER PUBLICATIONS

Ray Winn, "PCT Written Opinion of the International Searching Authority", dated May 17, 2019, International Searching Authority, PCT/US19/20934, pp. 3-5.*
(Continued)

*Primary Examiner* — Alan B Cariaso
(74) *Attorney, Agent, or Firm* — Entralta P.C.; Justin G. Sanders; Peter D. Weinstein (57) ABSTRACT

A walking assistance apparatus that includes an elongated staff having a handle at one end and a ground engaging tip at the other with the staff including a light pipe having a high intensity light emitting member disposed therein to produce light around the user's feet and a source of electrical energy coupled through a control circuit to energize the light emitting member. A plurality of switches are disposed on the handle to energize the light emitting member and the apparatus also includes a motion sensor which automatically turns the light emitting member ON when the apparatus is in use.

15 Claims, 4 Drawing Sheets

(51) Int. Cl.
  *F21L 4/08* (2006.01)
  *F21V 9/08* (2018.01)
  *F21V 23/04* (2006.01)
  *F21V 8/00* (2006.01)
  *F21Y 115/10* (2016.01)
  *A45B 9/04* (2006.01)
  *A45B 9/00* (2006.01)
  *A45B 7/00* (2006.01)

(52) U.S. Cl.
  CPC ............... *A45B 7/005* (2013.01); *A45B 9/04* (2013.01); *A45B 2009/005* (2013.01); *F21Y 2115/10* (2016.08)

(56) References Cited

U.S. PATENT DOCUMENTS

| | | | |
|---|---|---|---|
| 2,642,519 | A | 6/1949 | Caustin |
| 3,987,807 | A | 10/1976 | Varnell |
| 4,013,881 | A | 3/1977 | Sargent |
| 4,062,371 | A | 12/1977 | Bolen |
| 4,099,535 | A | 7/1978 | Hubacheck |
| 4,562,850 | A | 1/1986 | Earley et al. |
| 4,625,742 | A | 12/1986 | Phillips |
| 4,837,666 | A | 6/1989 | Conkle |
| 5,197,501 | A | 3/1993 | Ragatz |
| 5,331,990 | A | 7/1994 | Hall et al. |
| 5,351,704 | A | 10/1994 | Hunnicutt, Jr. et al. |
| 5,577,827 | A | 11/1996 | Leffingwell et al. |
| 5,582,196 | A | 12/1996 | Hae et al. |
| 5,595,434 | A | 1/1997 | Pasch et al. |
| 5,810,466 | A | 9/1998 | Yung |
| 5,960,805 | A * | 10/1999 | Murphy ............... A45B 3/04 135/16 |
| 6,145,993 | A | 11/2000 | Filippino |
| 6,267,481 | B1 | 7/2001 | Yang |
| 6,394,116 | B1 | 5/2002 | Winn |
| 10,306,958 | B1 * | 6/2019 | Oligie ............... F21L 4/08 |
| 2004/0264172 | A1 | 12/2004 | Roberts |
| 2005/0211284 | A1 * | 9/2005 | Dooley ............... A45B 3/00 135/65 |
| 2006/0090783 | A1 | 5/2006 | King-Fai |
| 2010/0147342 | A1 | 6/2010 | Navarro |
| 2012/0080064 | A1 | 4/2012 | Gorey et al. |
| 2015/0062874 | A1 | 3/2015 | Chien et al. |
| 2016/0341410 | A1 * | 11/2016 | Kohn ............... F21V 23/0464 |
| 2017/0175997 | A1 | 6/2017 | Rosenblum |
| 2017/0224072 | A1 | 8/2017 | Van Varick et al. |
| 2017/0224573 | A1 | 8/2017 | Challa |
| 2018/0112851 | A1 * | 4/2018 | Haungs ............... F21V 17/105 |
| 2018/0356233 | A1 | 12/2018 | Baqain |
| 2020/0085157 | A1 * | 3/2020 | Moyo ............... A45B 3/02 |

OTHER PUBLICATIONS

International Search Report, PCT/US19/20934 dated May 17, 2019, 2 pgs.

* cited by examiner

ILLUMINATED WALKING ASSISTANCE APPARATUS

FIELD OF THE INVENTION

The present invention relates generally to apparatus for assisting individuals in walking and more particularly to such an apparatus which provides general illumination in the immediate vicinity of the apparatus and also provides additional illumination which may be activated by the user for various purposes such as signaling others, finding a desired item and assisting the user to find the apparatus in the dark.

DESCRIPTION OF THE PRIOR ART

The prior art discloses a multitude of devices having self-contained illumination apparatus therein which are used either to aid persons in seeing better or used as a beacon or the like to designate the user's position to others. Light sources have been incorporated into the elongated shaft of the device or attached thereto in a manner to cast light for use by the user.

The most pertinent of the prior art is Applicant's issued U.S. Pat. No. 6,394,116 which discloses an illuminated walking assistance apparatus in the form of a staff having a light pipe in the lower portion thereof which provides diffused illumination in the immediate vicinity of the apparatus and at the same time a bright light visible for a substantial distance to alert or signal others but which is, in the main, not overly visible to the user.

Filippino U.S. Pat. No. 6,145,993 dated Nov. 14, 2000 discloses an integrated unit of hard transparent or translucent acrylic material formed with a light source, batteries, switch and conducting wires which integrated unit may be attached to a cane by either knot or slide means for purposes of signaling others of a sight handicapped user's need.

Yung U.S. Pat. No. 5,810,466 dated Sep. 22, 1998 discloses a walking cane having a flashlight in the handle to project light forwardly to illuminate a travel path for the user and an elongated gas filled tube light in the staff for general illumination around the area of the cane.

Leffingwell et al., U.S. Pat. No. 5,577,827 dated Nov. 26, 1996 is a cane device with an alarm and a lighted end.

Hall et al., U.S. Pat. No. 5,331,990 dated Jul. 26, 1994, is a safety cane device, which is also connected to a telephone alarm system. A lighted window in the cane's shaft aids the user's sight.

Hunnicutt, Jr. et al., U.S. Pat. No. 5,351,704 dated Oct. 4, 1994, provides for a lighted walking cane, with a body and ground tip composed of a clear-rubber material with reflecting means to supply light in a specific direction. Illuminating means and the circuit are housed in different portions of the cane.

Ragatz, U.S. Pat. No. 5,197,501 dated Mar. 30, 1993, is a lighted cane housing two light sources and an alarm. The switch and battery are housed separately from the light units. The light in the conventional opaque ground tip portion of Ragatz's invention is positioned to direct reflected light longitudinally along the shaft.

Earley et al., U.S. Pat. No. 4,562,850, dated Jan. 7, 1986, houses the switch in the handle, while the illumination device is near the base of the cane.

Phillips, U.S. Pat. No. 4,625,742, dated Dec. 2, 1986, is a cane that is used for lighting the user's walkway as well as a beacon for others to see the user. The light emitting end portion (ground tip) is translucent or transparent. The light source and battery are housed separately from the switch.

Hubachek, U.S. Pat. No. 4,099,535, dated Jul. 11, 1978, is for a walking cane for the blind; visible day or night, with a portion of the cane shaft above the ground tip having a window for the emission of light. The wear tip or ground engaging member is made of a conventional, opaque material. The switch is in the handle.

Varnell, U.S. Pat. No. 3,987,807, dated Oct. 26, 1976, has a light at the end of the tip of the cane, operated by a switch in the handle. Its purpose is to allow the user to see in dark corners and around areas.

Caustin, U.S. Pat. No. 2,642,519, dated Jun. 27, 1949, allows for motorists and drivers of vehicles to be able to see and recognize the user's affliction. The light travels through the shaft length. The ground tip is made from material that obstructs the light from the end of the shaft.

Giaimo, U.S. Pat. No. 2,271,190 dated Jun. 8, 1940, is for illuminating the region where the cane is to be placed.

Sargent, U.S. Pat. No. 4,013,881 discloses a flashing lamp means controlled through a switch by the user as well as a direct light beam through a shaft also controlled by a switch housed in the handle section for fingertip operation.

Bolen, U.S. Pat. No. 4,062,371 discloses a walking cane for use by the blind which includes a lamp energized by operating a control switch and a solar cell which produces current to recharge a battery stored within the hollow interior portion of the cane.

Hae et al., U.S. Pat. No. 5,582,196 discloses a multipurpose cane having a hollow handle which defines a storage chamber for keeping personal accessories and holds a lamp and battery assembly controlled by a switch to produce light for illumination and/or warning.

Pasch et al., U.S. Pat. No. 5,595,434 discloses a flashlight wand attachment for attaching to a lamp housing of a handle member or flashlight.

Yang, U.S. Pat. No. 6,267,481 discloses an illumination assembly for an umbrella which has a transparent tubular member including an LED received within a sleeve detachably mounted to the tubular member so that illumination from the LED is reflected outwardly from the transparent tubular member to increase the safety of using the umbrella.

Although the disclosed prior art devices function for the purposes intended, the need remains for an illuminated walking assistance apparatus which not only provides illumination to assist the user, a bright beacon-type light for signaling or warning purposes, but also an illuminated walking assistance apparatus which provides additional light means to assist the user.

SUMMARY OF THE INVENTION

An illuminated walking assistance apparatus which includes an elongated staff having a handle at one end and a ground engaging tip at the other with the staff including a light pipe having a diffused section disposed adjacent the tip portion and having a high intensity light emitting member disposed therein to produce light around the user's feet, a source of electrical energy coupled through a control circuit to energize the light emitting member, a motion sensor member coupled to the control circuit which automatically turns the light emitting member on when the apparatus is in use and a timeout member in the control circuit which automatically turns the light emitting member off when the apparatus is at rest for a predetermined period of time and an ambient light detector coupled to the control circuit which prevents the light emitting member from turning on when the ambient light is sufficient for the user to walk without light assistance.

DETAILED DESCRIPTION OF THE PREFERRED EMBODIMENT

The walking assistance apparatus of the present invention may take many forms such as a stick used by hikers or walkers and may be used for various purposes, however, for ease of illustration, the following description is presented using a walking cane as the specific apparatus incorporating the invention, such is, however, not to be taken as a limitation as to the scope of the claims. The illuminated apparatus of the present invention provides sufficient illumination to light the pathway of the cane user during nighttime or reduced light situations and also includes additional light sources activatable by switches controlled by the user to assist the user in various ways. For example, a pilot light is provided that is maintained in an illuminated condition at all times to assist the user in finding the apparatus particularly at night. There is also provided an additional high intensity LED controlled by a switch activated by the user to provide additional light for reading, finding a keyhole, illuminating a menu or finding a seat in a darkened theater or the like. An additional switch activatable by the user also will cause the main illumination LED at the tip of the apparatus to flash to thereby warn others of the existence of the user of the cane or to attract attention such as to hail a cab or the like. In addition to assist the user there is provided a motion sensor which automatically illuminates the main LED at the tip of the cane when the cane is in actual use and also provides an ambient light sensor which precludes the cane from having the main LED light activated when there is sufficient light for the user to utilize the cane without illumination assistance.

Figure 1:
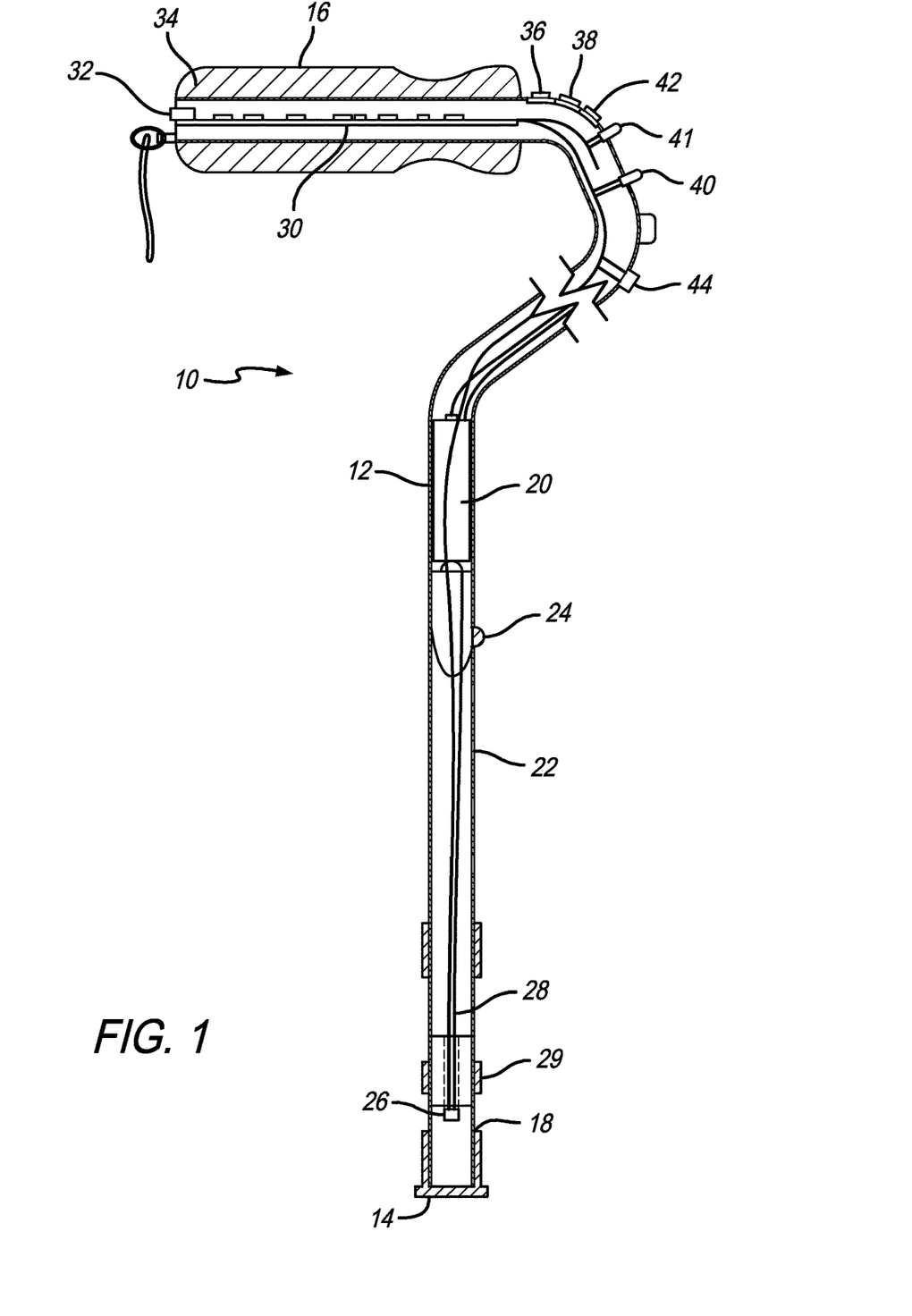
FIG. 1 is a schematic representation of a walking assistance apparatus constructed in accordance with the principles of the present invention.

Referring now to the drawings and more particularly to FIG. 1, there is shown generally at 10 a schematic diagram of an illuminated cane constructed in accordance with the principals of the present invention. The present invention may be incorporated as part of an umbrella, a hiking stick or other similar apparatus. The cane 10 includes an elongated staff 12 which has a ground engaging tip 14 at one end thereof and a handle 16 at the other end thereof. The ground engaging tip may also be a tripod or a large base that will provide the function of a stand alone cane. The elongated staff 12 includes a light pipe 18 disposed adjacent the tip portion 14. The light pipe 18 includes a frosted or diffused section and a clear or polished section. A red filter on a sliding tube of red transparent or translucent plastic 29 is provided for optional night time use. The red light provides enough illumination for navigating in a typical bedroom environment, while reducing the effects of the well-known phenomena of REM sleep cycle interruption by white light. Red light light is known to reduce this interruptive effect significantly. The elongated shaft 12 of the cane is hollow and receives a battery 20 internally thereof. The cane is also adjustable to various heights as may be needed by users. Such adjustment is through utilization of a plurality of detent holes 22 and a detent ball 24 as is well recognized by those skilled in the art. The main illumination member contained within the apparatus is a high intensity LED 26 which is connected by appropriate wiring 28 to a control circuit which is contained within a circuit board 30 which is disposed internally of the handle 16. The circuit board includes a control circuit and a USB port 32 as will be more fully described hereinbelow. As is well known by those skilled in the art, the handle 16 includes a foam grip 34. Although the handle is shown disposed orthogonally to the longitudinal axis of the elongated shaft 12, it will be understood by those skilled in the art that the shaft may be a continuous straight shaft with a handle disposed at the end thereof. It is, however, in accordance with the preferred embodiment of the present invention to utilize the handle orthogonally disposed to the elongated shaft as illustrated in FIG. 1. The primary reason for this is to enable the user to easily access the various control switches which are disposed on the elongated shaft.

The switches as disposed on the elongated shaft include an ON switch 36. This switch is an ON switch that activates the timer turning the light on, after the time runs down, the light goes off unless the switch is held in the ON position. Upon release, the light turns off after the timer runs down. A switch 38 is included to control the illumination of a reading light 40. Also disclosed is a switch 42 which when activated by the user will cause the LED 26 to flash so as to attract attention or to warn others of the existence of the user of the cane. Also disposed upon the cane is an ambient light sensor 44. The purpose of the ambient light sensor is to prevent the illumination of the high intensity LED 26 when there is sufficient ambient light for the user to be able to use the cane without the necessity of illumination. The ON switch 36 overrides the Light Sensor, Motion Sensor and FLASH functions. There is also provided a pilot light 41 which is always on to assist the user in finding the cane.

The circuit board contains a motion sensor which will be described more fully hereinbelow which when the cane is in use will automatically illuminate the high intensity LED 26 and the circuit board also includes a timeout apparatus such that when the cane is no longer in motion, the high intensity LED 26 will be automatically extinguished after a predetermined period of time.

As will be well understood by those skilled in the art ribbon wire is disposed in contact with the various switches and the various lights and the control circuit which is contained on the circuit board as well as the battery to provide appropriate access to the control circuit and to the switches and to the various lights to be activated as desired by the user.

Figure 2:
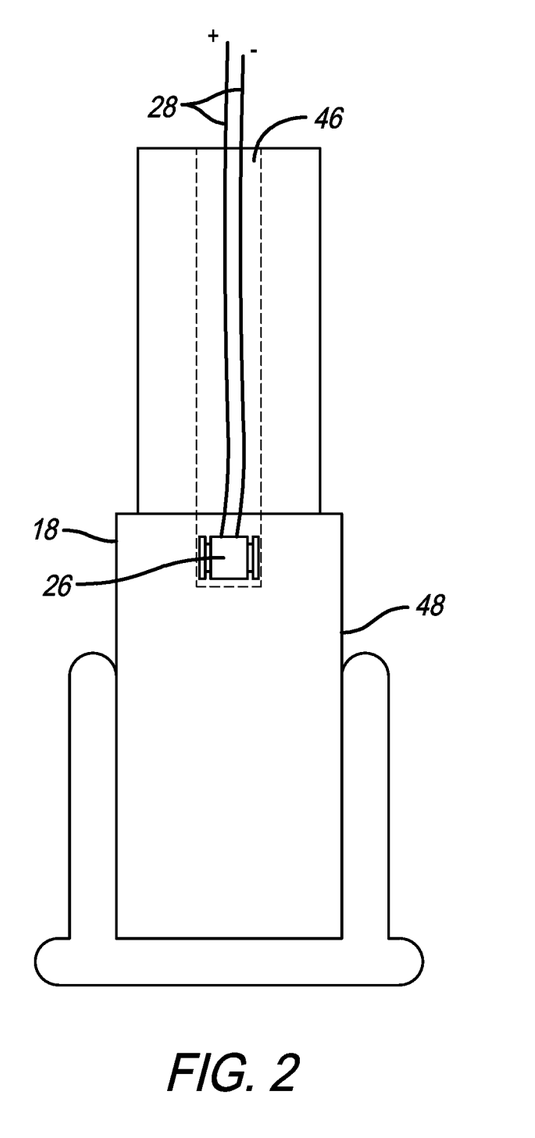
FIG. 2 is a fragmentary view of the lower portion of the apparatus shown in FIG. 1 which illustrates the light pipe and the LED illumination member.

Referring now more particularly to FIG. 2, the light pipe assembly is disclosed in additional detail. As is therein shown, the light pipe includes a counterbore 46 through which the wiring 28 extends to the LED array 26. The lower portion 48 of the light pipe 18 may be diffused to provide diffused illumination for use by the user and at the same time may also have a clear section so that bright light will emanate from the section 48 to alert others of the existence of the user or to emit the high intensity LED when it is flashing to alert others or to hail a taxi cab or the like.

Figure 3:
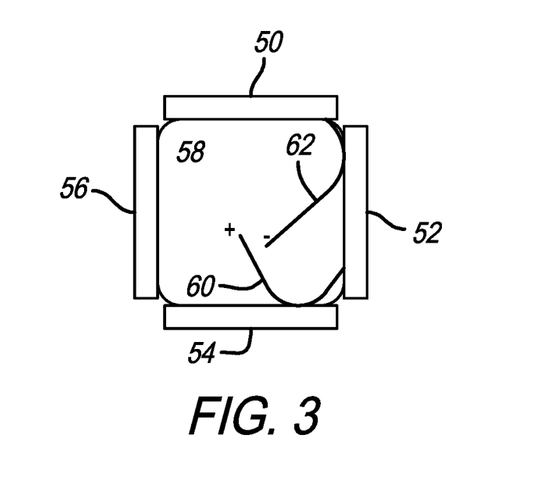
FIG. 3 is a top view of the LED array which is disposed in the lower portion of the apparatus as shown in FIG. 2.

In accordance with the preferred embodiment of the present invention, the LED array includes four LED chips 50, 52, 54 and 56 as shown in FIG. 3 which are mounted upon a substrate 58 that is disposed internally of the light pipe 18. The LED chips 50 through 56 have appropriate electrical connections thereto as shown by the leads 60 and 62 to provide electrical energy from the battery 20 to the LEDs to activate them to cause the high intensity light to be emanated from the LED 26.

Figure 4:
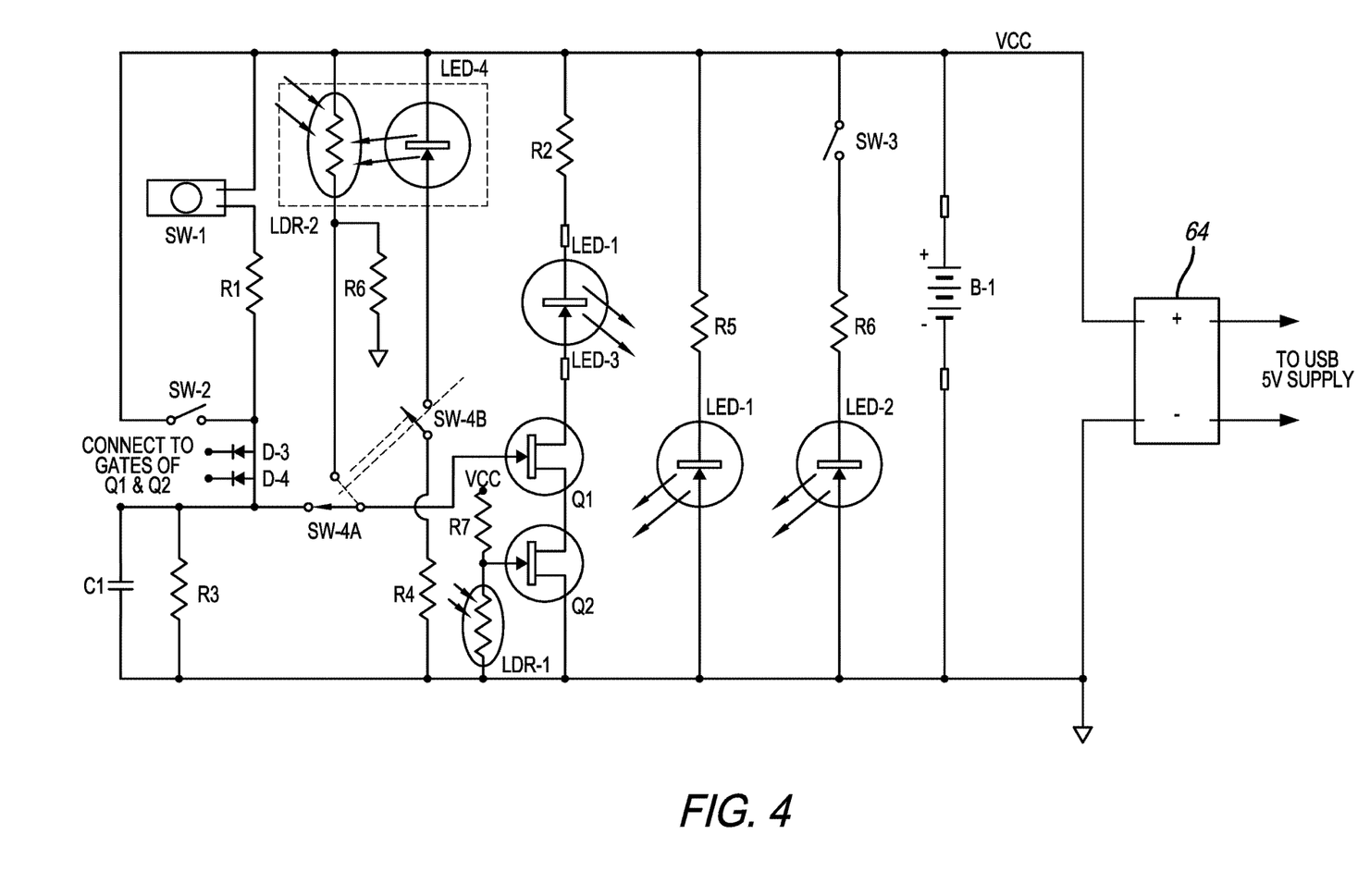
FIG. 4 is a schematic diagram showing an analog control circuit for the apparatus as shown in FIG. 1.

Referring now more particularly to FIG. 4, there is shown a schematic diagram of an analog circuit which is utilized to control the high intensity LED 26 at the tip of the cane. The following will be a description of the manner in which the circuit operates. A battery B1 supplies electrical energy to the various components in the circuit. In a darkened room with the main switch 36 (SW-2) in the position shown, the field effect transistor Q2 is in conduction due to the resistor R7 holding the base of Q2 positive while the light dependent resistor LDR-1 is near infinite resistance. When motion switch SW-1 closes temporarily by movement of the cane, positive voltage is applied through resistor R1 so that resistor R3 charges capacitor C1 to a voltage which is applied through switch SW-4A that causes field effect transistor Q1 to conduct thus completing the circuit causing current to flow through Q1, Q2, R2 and the main LED array 26 which is shown as LED-3 on the diagram. This also forward biases diodes D-3 and D-4. Resistor R3 is in parallel with capacitor C1 and slowly discharges capacitor C1 towards ground with a predetermined time period at which time the main light slowly dims and then extinguishes. A typical timeout period might be about 15 to 30 seconds or other time of convenience as may be desired. If the cane senses any further motion during the timeout period, it recharges capacitor C1 back to the supply voltage, thus keeping the main LED-3 on as long as the cane is in motion. Once the cane is put to rest, the light will automatically go off after the timeout period expires. The auto ON function when the cane is moved does not operate if there is sufficient light for the user to safely use the cane, thus conserving battery power. The auto ON function is enabled when the ambient light falls below a certain level. LDR-1 is a light-dependent resistor that reduces its resistance as the ambient light increases causing the base of field effect transistor Q2 to be connected to ground, thus presenting it from conducting current. This interrupts the current flow through Q1, R3 and LED-3. When there is adequate ambient light, the resistance of the light-dependent resistor is reduced bringing the gate of Q1 low thus preventing Q1 from conducting even with inputs from the motion detection switch.

If the user needs to turn the high intensity LED 26 (LED-3) on manually, that is accomplished with push button switch 36 (SW-4A) which connects the gate of field effect transistor Q1 directly to the positive voltage bus. The gate of Q2 is held positive by resistor LDR-1 and the connection to the positive bus Vcc. By applying voltage to both gates of field effect transistors Q1 and Q2, any other input signal from any other source has no effect. This function is useful when the user wants to use the main cane light to read a menu or program, search under a bed, find seat location at an event, look in a closet or other use. The light turns off when the switch is released, either after a timeout period in a darkened room, or immediately in a lighted room.

The user can also employ the main light as an emergency or attention-getting flasher. The built-in function is activated by operating the flash switch 42 (SW-4B) to the alternate position. It is a push-on/push-off alternate action switch that does not require the user to hold it on. The operation is accomplished by LDR-2 and LED-4. When the switch is operated, the gate of Q1 is moved from its normal connection to the junction of LDR-2 and LED-4. When the switch is operated, the gate of Q1 is moved from its normal connection to the junction of LDR-2 and R6. The switch also connects the flashing LED-4 via R4 causing it to flash repeatedly. A rate of about six times per second might be typical. It is optically coupled to light sensitive resistor LDR-2. When the flasher is on, the resistance of LDR-2 drops to a very low value, causing the voltage of the gate of Q1 to rise. This results in turning the main LED 26 (LED-3) to light in synchronism with the flashing LED. When the flasher is off, the resistance rises, thus reducing the current flowing to the gate of Q1. R6 insures that the gate is brought to near common potential between flashes by discharging distributed capacitance on the circuit board. The user must operate the switch 42 again to stop the flashing and return the system to normal operating condition. This timing method has been employed for two reasons: 1) it does not require the use of an active switching device which is more expensive and 2) it does not give rise to any FCC licensing or tagging requirements. Alternatively, an electronic multi-vibrator could be used to send ON/OFF signals to the gates of Q1 and Q2 and can be implemented by anyone skilled in the art.

A pilot light 41 (LED-1) is connected through resistor R5 between the positive voltage bus and ground and is therefore always ON as long as the battery is charged. The function of the pilot light is to assist the user in locating the cane in a darkened room. The operating current is a nominal 1.5 milliamps. It will not discharge the battery unless the cane is not used for a substantial period of time such as three to five months.

The reading light 40 (LED-2) is located near the head end of the cane as shown in FIG. 1 and therefore provides the user with a convenient light source for locating a door key, reading menus, maps, programs at events or is a handy bedside light source. It is operated with a momentary push button switch 38 (SW-3) forcing current through resistor R6 and LED-2.

The battery 20 is charged using an industry supplied charger 64 which is internal to the container pod. The charger derives its voltage from an industry standard 5 Volt USB port 32 located on the handle of the cane. Thus, the voltage can be derived via a phone charger, computer port or from a standalone USB power supply.

Figure 5:
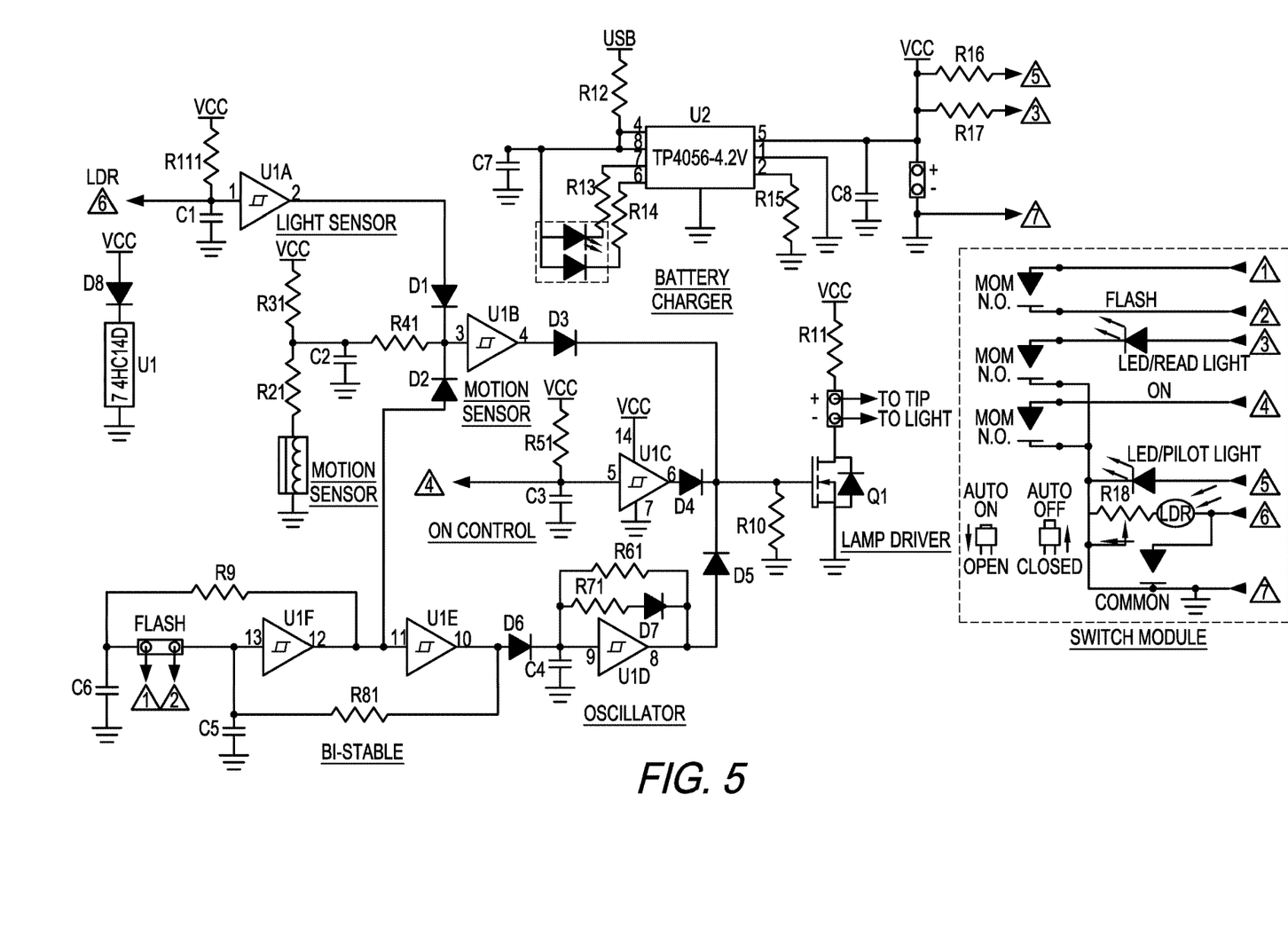
FIG. 5 is a schematic diagram of a digital circuit which is utilized to control the light emitting members of the apparatus as shown in FIG. 1.

Referring now to FIG. 5, the light sensor consists of Schmidt trigger U1A, R111, C1, and the light sensitive resistor (LDR) and R18, the latter two located in the switch module. This circuit acts as a threshold voltage detector with hysteresis. The remote light sensitive resistor, LDR, R18 (switch module) and R111 form a voltage divider network. The LDR exhibits a very high resistance in the dark and decreases in resistance in lighted conditions. A sensitivity adjustment is provided by R18 connected as a variable resistor which is in series with the LDR, returning to circuit common; hereinafter referred to as ground. If the resistance of the combination of the LDR and R18 are higher than R111, then the input of U1A goes positive, and the output on pin 2 goes to ground as it is an inverting device. If the resistance of the LDR and R17 become lower than R111, then the output at pin 2 goes positive and is applied to pin 3 of U1B through diode D1, driving the output of U1B to ground. C1 acts as a smoothing filter to avoid noises such as ambient light flickering as in fluorescent lighting or other aperiodic changes in ambient light conditions. U1B also has some hysteresis in that once it is triggered in one direction, the input must change significantly to cause a change in the other direction. This function is well known to those skilled in the art and is an inherent characteristic of Schmidt trigger devices.

In the motion sensor section, R31 charges C2 to VCC, applying VCC to pin 3 of U1B through R41. D1 and D2 are back biased, preventing current to flow backwards to U1A and U1E/F. This drives pin 4 to ground, absent any other signal. When the motion switch is activated by movement of the cane, the internal contacts momentarily close, discharging C2 to ground, causing the output of U1B to go positive which applies a positive voltage through D3 to the gate of MOS transistor Q1 which in turn applies current from +VCC through R11 and the LED light array located at the tip of the cane. However, this action is overridden if the resistance of the LDR and R17 is lower (presence of light) than the value of R111 because of high light conditions which causes the output of U1A to go positive, driving the output of U1B to ground removing the positive signal to Q1. Resistor R41 prevents any signal caused by the motion switch to overcome the higher current signal from the light sensor from U1A. If the LDR and R17 resistance is higher because of low light levels, this causes the output of U1B to go negative. In the meantime, C2 is charging at a time constant depending on the value of R111 and C1. D1 and D2 prevent any back current leakage if their sources of voltage are at ground. At these conditions, movement of the cane will cause the motion sensor to intermittently impart a negative signal to the input of U1B. This causes the output of U1B to go positive and causes Q1 to conduct. The net effect is that if the light level is low, then movement of the cane will cause pin 3 of U1B to go low. When the voltage on C1 is below the trigger level, the positive output of U1B causes Q1 to conduct. When the voltage of C1 reaches the trigger threshold, the output of U1B goes to ground, causing Q1 to be non-conducting. The purpose of these two circuits is to ensure that the cane tip is lighted when illumination is low, and the cane is in motion. Conversely, when the light level is high, the Q1 is prevented from conducting despite cane motion. In low light conditions, the light will extinguish in about 15-20 seconds after motion ceases. If the cane is moved into a lighted location before the timer has completed its cycle, the light will extinguish, and the timing cycle is terminated. R21 protects the contacts of the motion sensor from high inrush currents from C2, extending the life of the motion sensor and reducing the probability of high current 'welding' of the contacts and increasing lifetime of the motion sensor.

A flash function is provided for emergency or signaling situations such as hailing a taxi or extra notice in a crosswalk. The flash operates independently of the light and motion functions and overrides both the light and motion functions. This function is operated by alternately pressing the red flash switch on the switch module.

U1E and U1F are connected with C5, C6, R8 and R9 to form a BI-STABLE 'flip-flop'. A circuit that is well known to those skilled in the art. Alternate closures of the FLASH contacts /1\ /2\ cause the bi-stable to go alternately from state 0 to state 1. In state 0, the voltage on pin 11 of U1E and pin 12 of U1F is positive and the voltage on pin 10 of U1E is near ground. Thus, in state 0, the input of pin 3 of U1B is driven positive from the voltage of pin 11 & 12 of U1E and U1F through D2. This drives pin 4 of U1B to ground, essentially disabling all action from the Light Sensor and Motion Sensor functions. In state 0, pin 10 of U1E is near ground, allowing the relaxation oscillator comprised of C4, R61, R71, U1D and D7 to operate. The output of the oscillator drives a voltage through D5, causing Q1 to alternately conduct at the frequency of the oscillator. For the values shown, this is approximately 2 flashes per second, but can be changed by appropriate selection of the values of C4, R61, R71 and D7. When the bi-stable is in state 1, the voltage at pin 11 and 12 of U1F and U1E is near ground, thus removing the signal to U1B. In state 1, the voltage at pin 9 of U1E is positive, driving the voltage of pin 8 of U1D to near ground, thus disabling the oscillator.

When the output of the oscillator is positive, C4 is charged through R61. When the output of the oscillator is negative, C4 is discharged by R61 and the parallel combination series impedance of R71 and D7. This creates asymmetry in the positive and negative times of the oscillator, with the positive output (light on) being longer than the negative cycle (light off) for the values shown. This is desired to provide an increased sense of brightness to a viewer while maintaining the attention-getting feature of a flashing light. The frequency of approximately 2 Hz is below the frequency that causes spatial disorientation of most people. R10 provides a discharge path for the residual input capacitance of Q1's gate, ensuring that the gate returns to ground before the next positive pulse from the oscillator. The battery voltage can reach a voltage of over 4.05 volts, causing the oscillator to 'latch' in the positive output. To alleviate this situation, D6 is connected in series with VCC and the power input terminal of U1D, thus reducing the voltage for U1D by approximately 0.5 volts, ensuring that the oscillator does not self-latch.

An ON control switch function is provided if the user wants to turn on the tip light of the cane in an otherwise lighted condition, such as searching for a misplaced item in a darkened closet in a well-lighted room or needing light augmentation at their discretion. The green ON switch, located in the Switch Module is a momentary normally open switch. C3 is charged to +VCC by resistor R51. When the ON switch is closed momentarily and released, pin 5 of U1C goes to ground and pin 6 of U1C goes positive. The voltage is coupled through D4 causing Q1 to conduct, turning the tip light on. After a time period determined by the value of C4 and R51, pin 5 of UC1 goes to ground, removing the signal to the base of Q1. Each momentary push of the ON switch resets the timer. Given the combination of hysteresis and values of C3 and R51, the on time is about 15-20 seconds, but can be modified by those skilled in the art. If the ON switch is held on, the light remains lit and turns off when the switch is released after the timer runs its course. The ON function overrides all other functions including the light sensor function and the motion sensor function. D3 and D5 prevent back feeding of signals to the rest of the circuitry.

A pilot light function is provided from an 'always on' connection through R16 to a small LED lamp on the switch module, providing location assistance to the uses in a darkened environment, such as at bedside.

A read light function is provided by pressing a yellow momentary switch on the switch module to an LED mounted at the head of the switch module. This gives the user a light source to read menus, concert programs or other requirements. Power is provided from VCC through R17.

An optional Auto Disable alternate action switch in the switch module allows the user to disable the motion sensor function in the event of being carried in an aircraft, vehicle over rough roads, shipping, or long-term storage of the cane. This is implemented by connecting pin 1 of U1A to ground, causing pin 2 of U1A to positive and pin 4 of U1B to go negative. This function only disables the motion switch function. All other functions remain active at the option of the user.

A battery charger function is provided using an industry standard Li-Ion (U2) charger circuit. The input power to the charging circuit is via a USB connector at the back of the cane handle as depicted in FIG. 1. A single bi-color led with resistors R13 and R14 next to the USB connector indicates the state of charge of the Li-Ion battery which is located in the cane body as depicted in FIG. 1. C7 and R12 serve to reduce high frequency noise and other spurious artifacts in the external charging device. An external standard 5-volt USB charger supplies the power for the Battery Charger circuit. R15 sets that maximum current to be delivered from the Battery Charger circuit. For this circuit, the 2.7K value sets the typical charging current to a maximum of approximately 400 milli-amperes. C8 provides further filtering and noise free charging current to the battery.

What is claimed is:

1. An illuminated walking assistance apparatus comprising:
   an elongated staff having a ground-engaging tip portion at a first end and a handle at an opposing second end;
   the staff providing a light pipe positioned proximal the tip portion and having light-emitting member disposed therein to selectively illuminate the ground proximal the tip portion;
   the staff further providing a red nightlight which is always on so as to facilitate locating the apparatus in a dark environment.

2. The illuminated walking assistance apparatus of claim 1, wherein the light-emitting member comprises an LED array including four LED chips supported on a substrate disposed internally of the light pipe.

3. The illuminated walking assistance apparatus of claim 1, further comprising a red filter on a sliding tube adjacent the light pipe for nighttime use to reduce the effects of REM sleep cycle interruption.

4. The illuminated walking assistance apparatus of claim 1, further comprising a source of electrical energy coupled through a control circuit to energize the light-emitting member.

5. The illuminated walking assistance apparatus of claim 4, further comprising:
   a high intensity white LED disposed in the handle coupled to the control circuit; and
   a push button switch coupled to the control circuit to turn the white LED on to assist the user to find a desired item.

6. The illuminated walking assistance apparatus of claim 1, further comprising a push-on push-off switch coupled to the control circuit which when in the ON position will cause the light-emitting member to flash on and off repeatedly to attract attention.

7. The illuminated walking assistance apparatus of claim 4, wherein the source of electrical energy is a rechargeable lithium battery.

8. The illuminated walking assistance apparatus of claim 7, further comprising a USB port disposed at the handle for use in charging the battery.

9. The illuminated walking assistance apparatus of claim 4, wherein the control circuit is disposed on a circuit board disposed in the handle.

10. The illuminated walking assistance apparatus of claim 9, wherein the control circuit comprises a digital control circuit.

11. The illuminated walking assistance apparatus of claim 9, wherein the control circuit comprises an analog control circuit.

12. The illuminated walking assistance apparatus of claim 4, further comprising a motion sensor member coupled to the control circuit which automatically turns the light-emitting member on when the apparatus is in use.

13. The illuminated walking assistance apparatus of claim 4, further comprising a time out sensor coupled to the control circuit which automatically turns the light-emitting member off when the apparatus is at rest for a predetermined amount of time.

14. The illuminated walking assistance apparatus of claim 4, further comprising an ambient light detector coupled to the control circuit which prevents the light-emitting member from turning on when the ambient light is sufficient for the user to walk without light assistance.

15. An illuminated walking assistance apparatus comprising:
   an elongated staff having a ground-engaging tip portion at a first end and a handle at an opposing second end;
   the staff providing a light pipe positioned proximal the tip portion and having a light-emitting member disposed therein to selectively illuminate the ground proximal the tip portion; and
   a red filter slidably engaged with the light pipe for selectively covering the light-emitting member, thereby reducing the effects of REM sleep cycle interruption during use of the apparatus at night.

* * * * *